(12) United States Patent
Seo

(10) Patent No.: US 8,172,024 B2
(45) Date of Patent: May 8, 2012

(54) AIRBAG CONTROL SYSTEM

(75) Inventor: Jeong Wook Seo, Seoul (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 35 days.

(21) Appl. No.: 12/767,586

(22) Filed: Apr. 26, 2010

(65) Prior Publication Data
US 2011/0101661 A1    May 5, 2011

(30) Foreign Application Priority Data

Nov. 2, 2009 (KR) .................. 10-2009-0104900

(51) Int. Cl.
*B60R 21/013* (2006.01)
*B60R 21/0134* (2006.01)

(52) U.S. Cl. ................ 180/271; 280/735; 701/45

(58) Field of Classification Search ........ 180/271, 180/274; 280/735; 340/436; 701/45
See application file for complete search history.

(56) References Cited

U.S. PATENT DOCUMENTS

| | | | | |
|---|---|---|---|---|
| 5,959,552 A * | 9/1999 | Cho | ....... | 340/903 |
| 6,757,611 B1 * | 6/2004 | Rao et al. | ....... | 701/301 |
| 2004/0049331 A1 * | 3/2004 | Schneider | ....... | 701/45 |
| 2004/0066023 A1 * | 4/2004 | Joseph | ....... | 280/735 |
| 2006/0064220 A1 * | 3/2006 | Murakami et al. | ....... | 701/45 |
| 2008/0119993 A1 * | 5/2008 | Breed | ....... | 701/46 |

FOREIGN PATENT DOCUMENTS

| KR | 20-0146788 Y1 | 6/1999 |
|---|---|---|
| KR | 10-0630841 B1 | 10/2006 |

* cited by examiner

*Primary Examiner* — Paul N. Dickson
*Assistant Examiner* — Joseph Rocca
(74) *Attorney, Agent, or Firm* — Morgan, Lewis & Bockius LLP

(57) ABSTRACT

An airbag control system may include a sensor unit monitoring status of a vehicle being driven and an object located in front of the vehicle, an interior airbag deployed to an interior of the vehicle being driven, an exterior airbag deployed to an exterior of the vehicle being driven, and a control unit measuring a relative speed between the vehicle being driven and the object located in front of the vehicle from the sensor unit after deploying the exterior airbag, and deploying the interior airbag when it is determined that the measured relative speed exceeds an interior critical speed at which the interior airbag is deployed.

9 Claims, 3 Drawing Sheets

AIRBAG CONTROL SYSTEM

CROSS-REFERENCE TO RELATED APPLICATIONS

The present application claims priority to Korean Patent Application Number 10-2009-0104900 filed on Nov. 2, 2009, the entire contents of which application is incorporated herein for all purpose by this reference.

BACKGROUND OF THE INVENTION

1. Field of the Invention

The present invention relates, in general, to airbag control systems and, more particularly, to an airbag control system for simultaneously controlling both an interior airbag and an exterior airbag.

2. Description of Related Art

Generally, airbags are installed in a vehicle to protect passengers in the event of a vehicle crash. As shown in FIG. 1, the airbags include interior airbags 30 and exterior airbags 50.

The interior airbags 30 are installed at a driver seat and a passenger seat which are provided at a front position in a vehicle 10, and are deployed in the event of a vehicle crash, thus protecting a driver and a passenger. Further, the exterior airbags 50 are installed at a front position of the exterior portion of the vehicle 10, thus protecting the vehicle 10 being driven and passengers from a pedestrian who is in front of the vehicle 10 or a vehicle ahead of the vehicle in question in the event of the vehicle crash.

However, since sensors collecting data to deploy the interior airbag 30 and the exterior airbag 50 are different from each other, the interior airbag 30 and the exterior airbag 50 are constructed to be individually controlled. Because of different reference values, the time of deployment of the airbags 30 and 50 may vary. Thus, the airbags 30 and 50 are problematic in that they may not effectively protect passengers in the event of a vehicle crash.

Further, since the interior airbag 30 and the exterior airbag 50 are separately controlled, the number of parts is increased, so that the manufacturing cost increases or the operating method is complicated, and thus the efficiency with which the airbags are deployed is low.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an airbag control system which is capable of effectively protecting a passenger in the event of a vehicle crash and to provide an airbag control system which minimizes the number of parts for controlling an interior airbag and an exterior airbag and realizes a simple operating method, thus reducing manufacturing cost and increasing the efficiency with which the airbags are deployed.

In order to achieve the above objects, according to one aspect of the present invention, there is provided an airbag control system, including a sensor unit monitoring status of a vehicle being driven and an object located in front of the vehicle, an interior airbag deployed to an interior of the vehicle being driven, an exterior airbag deployed to an exterior of the vehicle being driven, and a control unit measuring a relative speed between the vehicle being driven and the object located in front of the vehicle from the sensor unit after deploying the exterior airbag, and deploying the interior airbag when it is determined that the measured relative speed exceeds an interior critical speed at which the interior airbag is deployed.

The interior critical speed may be approximately 22 km/h to approximately 32 km/h.

The exterior airbag may be deployed when an expected collision time period of the vehicle against the object located in front of the vehicle is equal to or less than a first critical value, the relative speed of the vehicle relative to the object located in front of the vehicle is equal to or exceeds an exterior critical speed, and a value of a width of the object located in front of the vehicle overlapped with respect to a width of the vehicle being driven in the event of a collision is equal to or larger than a predetermined overlap value.

The first critical value may be approximately 200 msec.

The predetermined overlap value may be approximately 5%.

The exterior critical speed may be smaller than the interior critical speed.

The exterior critical speed may be approximately 17 km/h to approximately 27 km/h.

The control unit may determine whether speed values of the vehicle in directions of an X axis and a Y-axis exceed second critical values when the relative speed is larger than the interior critical speed at which the interior airbag is deployed, and deploys the interior airbag when the speed values of the X axis and the Y-axis exceed the second critical values, wherein the X axis and Y axis are a longitudinal direction and a traverse direction of the vehicle.

The interior airbag may include a driver seat airbag and a passenger seat airbag, the control unit is further connected to a passenger detection sensor unit which determines whether a passenger is sitting in a passenger seat or not, and the control units control the passenger seat airbag not deployed when absence of the passenger is detected by the passenger detection sensor unit.

As is apparent from the above description, an airbag control system according to the present invention is advantageous in that it has an integrated system to enable the time of an exterior airbag and an interior airbag being deployed to be simultaneously controlled, thus being capable of effectively protecting a passenger.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
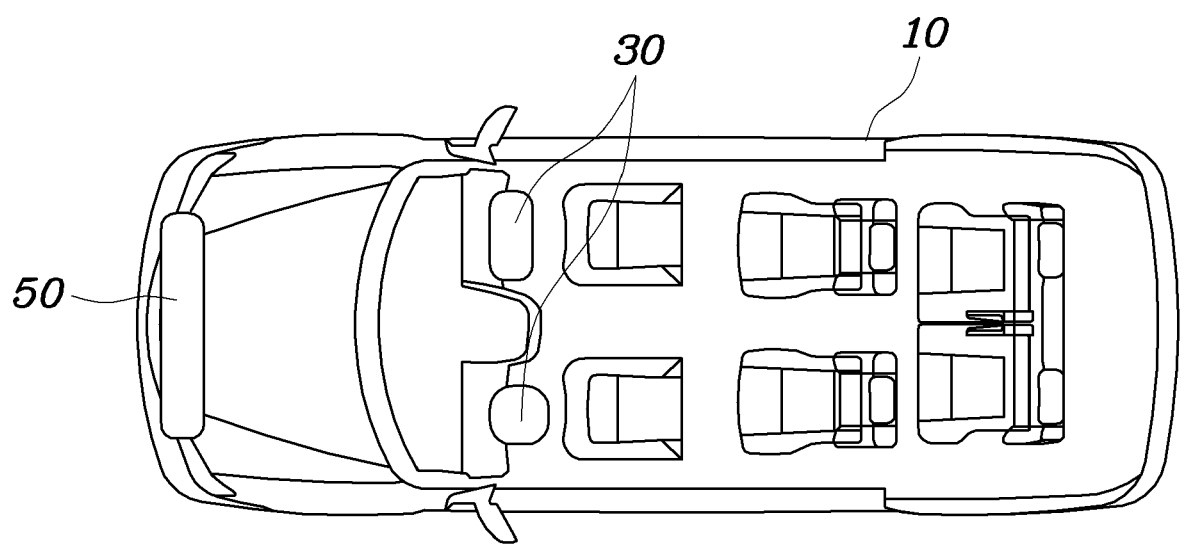
FIG. 1 is a plan view illustrating an exterior airbag and an interior airbag mounted to a conventional vehicle.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
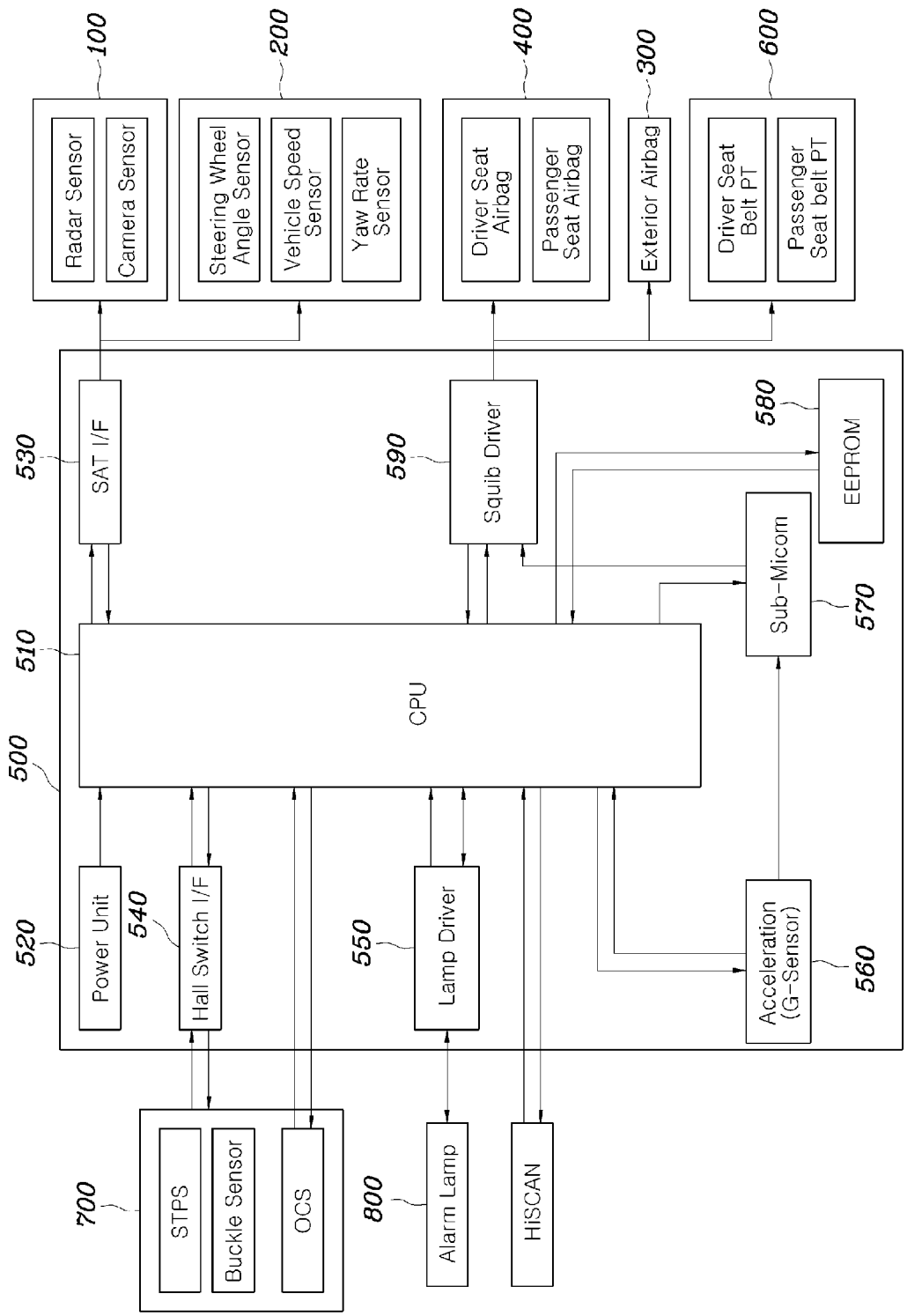
FIG. 2 is a block diagram illustrating an exemplary airbag control system according to the present invention.
Figure 3:
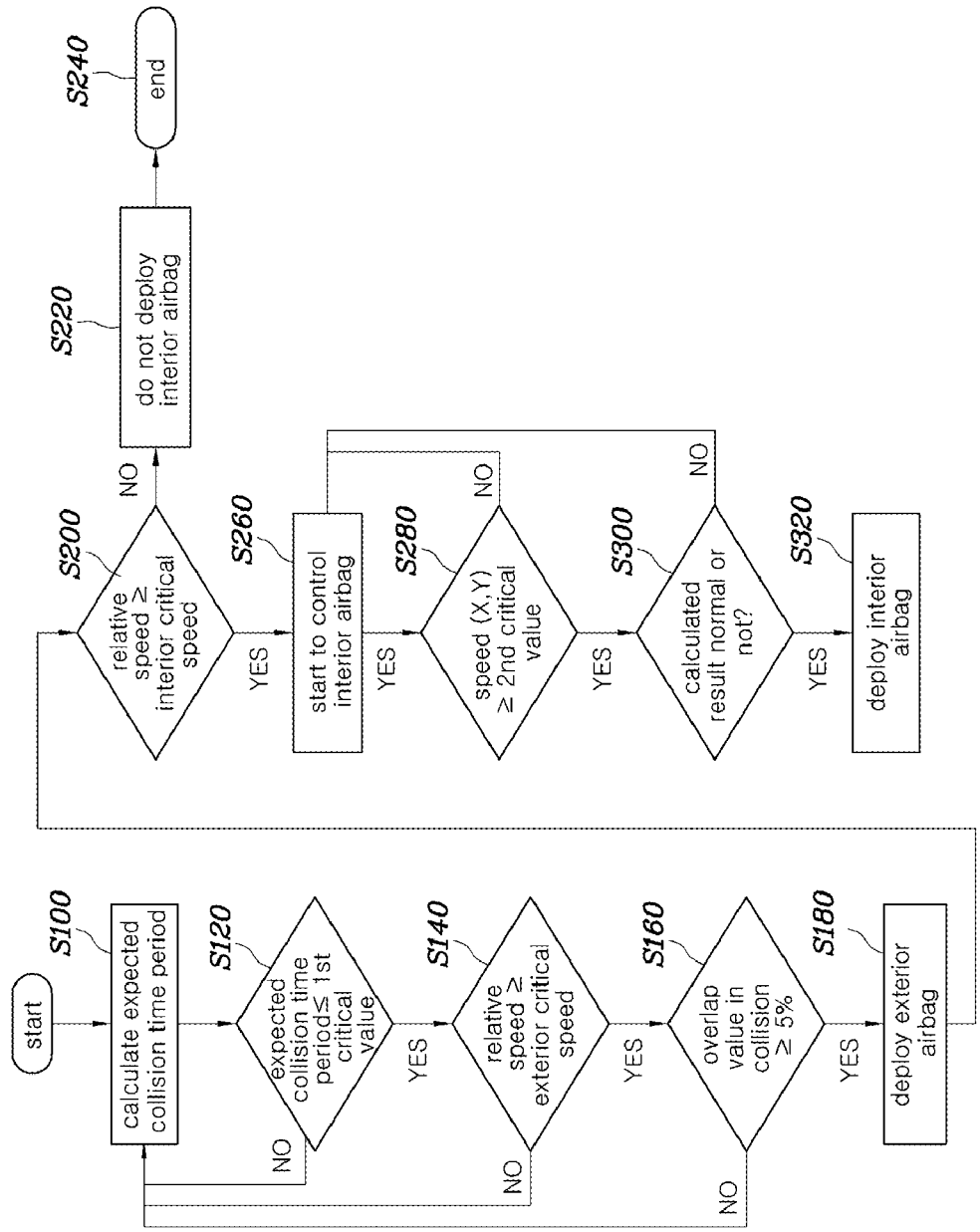
FIG. 3 is a flowchart illustrating the operation of the exemplary airbag control system according to the present invention.

FIG. 2 is a block diagram illustrating an airbag control system according to an exemplary embodiment of the present invention. FIG. 3 is a flowchart illustrating the operation of the airbag control system according to an exemplary embodiment of the present invention.

Referring to FIG. 2, the airbag control system according to an exemplary embodiment of the present invention includes sensor units 100 and 200, airbags 300 and 400 which are mounted to a vehicle, and a control unit 500 which simultaneously controls the time of deployment of the exterior airbag 300 and the interior airbag 400.

The sensor units 100 and 200 are mounted to the vehicle to monitor the status of an object located in front and the condition of the vehicle being driven. The sensor units 100 and 200 may include a first sensor unit 100 which monitors the condition of the preceding object, and a second sensor unit 200 which monitors the condition of the vehicle being driven.

The first sensor unit 100 may use a radar sensor which measures a relative distance to the object located in front and a speed relative to the object, and a camera sensor which detects the shape of the object. The second sensor unit 200 may use a vehicle speed sensor which measures the speed of the vehicle being driven, a yaw rate sensor which measures a driving yaw rate, and a steering wheel angle sensor which measures a driving direction.

The airbags 300 and 400 are mounted to the vehicle to protect the vehicle and passengers in the event of a vehicle crash, and include the interior airbag 400 having a driver seat airbag and a passenger seat airbag which are deployed towards passengers in the vehicle, and the exterior airbag 300 which is deployed forwards outside the vehicle. Of course, the interior airbag 400 may further include a side airbag or a curtain airbag, in addition to the driver seat airbag and the passenger seat airbag.

Values measured by the sensor units are transmitted to the control unit 500. The control unit 500 functions to deploy the exterior airbag 300 and the interior airbag 400 according to predetermined references. To this end, the control unit 500 includes a computational unit CPU 510 which calculates the time when the airbags 300 and 400 are deployed according to the values measured from the sensor units 100 and 200, thus transmitting deployment instructions to the exterior and interior airbags 300 and 400.

A power unit 520 is connected to the computation unit 510, thus supplying power to the computation unit 510. In order to collect measured values from the sensor units 100 and 200, an SAT interface (SAT I/F) 530 is provided between the computation unit 510 and the sensor units 100 and 200.

When the values transmitted from the sensor units 100 and 200 are calculated, so that it is determined whether to deploy the airbags, the computation unit 510 transfers data to a sub-micom 570. When the sub-micom 570 determines whether the calculated result is normal or not, a firing instruction is transferred to a squib driver 590, so that gas is injected into the airbags 300 and 400.

In order to determine whether to deploy the passenger seat airbag according to the presence of a passenger in the passenger seat when the interior airbag 400 is deployed, the computation unit 510 may be connected to a passenger detection sensor unit 700 which detects the presence of the passenger, for example, an STPS, a buckle sensor, or an OCS through a hall switch interface 540. When it is determined that there is no passenger in the passenger seat based on the detected result, the passenger seat airbag is not deployed no matter what the conditions are.

Meanwhile, an acceleration sensor 560 is connected to the computation unit 510 to detect a vehicle collision when the interior airbag 400 is deployed, and determines whether a vehicle collision has occurred or not based on the X-axis value and the Y-axis value measured by the acceleration sensor 560.

In order to more effectively protect passengers when the airbags 300 and 400 are deployed, a safety device 600 may be further provided to adjust seat belts of the driver seat and the passenger seat in the event of a vehicle collision.

Further, an electrically erasable programmable read-only memory (EEPROM) 580 may be connected to the computation unit 510 to store the collision records and failure records of the vehicle, and an alarm lamp 800 may be connected to the computation unit 510 via a lamp driver 550 to be turned on or off according to the instructions of the computation unit 510.

The airbag control system according to an exemplary embodiment of the present invention includes the integrated control unit 500 which calculates the time from the first sensor unit 100 and the second sensor unit 200 when the exterior airbag 300 and the interior airbag 400 are to be deployed, thus being capable of effectively protecting a passenger.

The operation of the airbag control system according to an exemplary embodiment of the present invention will be described below with reference to FIG. 3.

First, when data measured from the sensor units is collected, the expected collision time period before a vehicle being driven collides with an oncoming object is calculated at step S100. As the sensor unit for measuring the time to collision, a radar sensor, the data of a camera sensor, a steering wheel angle sensor, or a yaw rate sensor may be used.

When the expected collision time period is calculated at step S100, it is determined whether the calculated value is equal to or less than a first critical value at step S120. The first critical value may be determined by a value which is obtained in advance through experimentation, and is 200 msec, for example, about 0.2 seconds. Conversely, when the expected collision time period is less than the first critical value, the process returns to the step of calculating the time to collision.

If it is determined that the expected collision time period is larger than the first critical value, it is determined whether a relative speed of the vehicle relative to the oncoming object is an exterior critical speed at step S140.

Here, the relative speed designates a relative speed between the vehicle which is being driven and a detected object and may be measured by the first sensor unit. Further, the exterior critical speed designates a minimum relative speed at which the airbag must be deployed, and may be set to be 17 km/h to 27 km/h, preferably, 22 km/h. Meanwhile, when it is determined that the relative speed is less than the exterior critical speed, the process returns to the step of calculating the time to collision.

Subsequently, when it is determined that the relative speed is equal to or exceeds the exterior critical speed, an overlap value is measured in the event of a collision, and it is determined whether the overlap value is equal to or larger than a predetermined overlap value, at step S160. Next, when the overlap value exceeds the predetermined overlap value, for example, 5%, the exterior airbag is deployed at step S180. Here, the overlap value designates a width of an object overlapped relative to a width of the vehicle which is being driven. Conversely, if the overlap value is under 5%, the process returns to the step of calculating the time to collision.

When the exterior airbag is deployed as such, it is determined whether the relative speed is equal to or larger than an interior critical speed, at step S200. Here, the interior critical speed designates a minimum speed at which the interior airbag must be deployed, and the interior critical speed may be set to 22 km/h to 32 km/h, preferably, 27 km/h. On the other hand, when the relative speed is less than the interior critical speed, the interior airbag is not deployed at step S220 and a control operation is terminated at step S240. According to an exemplary embodiment of the present embodiment, the interior critical speed may be larger than the exterior critical speed.

When the relative speed is equal to or exceeds the interior critical speed, the interior airbag is controlled at step S260, and it is determined whether the speed values of the X axis and Y axis exceed second critical values at step S280. Here, the speed values of the X axis and the Y axis may be calculated by integrating an acceleration value measured from the acceleration sensor in the control unit, wherein the X axis and the Y axis may be a longitudinal direction and a traverse direction of the vehicle respectively.

Subsequently, if the speed values of the X axis and Y axis exceed the second critical values, it is determined whether the calculated result is normal or not at step S300, and the interior airbag is deployed at step S320 if the calculated result is normal. Here, it is determined in the sub-micom whether the calculated result is normal or not. According to the instruction from the sub-micom, the airbag can be deployed. On the other hand, if it is determined that the speed value is less than the second critical values and the calculated result is not normal, the process may return to the step of starting to control the interior airbag.

As described above, the present invention provides an airbag control system, which is capable of integratedly controlling the time of deployment of an exterior airbag and an interior airbag, thus enabling a passenger to be effectively protected.

For convenience in explanation and accurate definition in the appended claims, the term "front" is used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An airbag control system, comprising:
    a sensor unit monitoring status of a vehicle being driven and an object located in front of the vehicle;
    an interior airbag deployed to an interior of the vehicle being driven;
    an exterior airbag deployed to an exterior of the vehicle being driven; and
    a control unit measuring a relative speed between the vehicle being driven and the object located in front of the vehicle from the sensor unit;
    wherein the control unit deploys the exterior airbag when an expected time period until collision of the vehicle against the object located in front of the vehicle is equal to or less than a first critical value, the relative speed of the vehicle relative to the object located in front of the vehicle is equal to or exceeds a first exterior critical speed, and an overlapping value of a width of the object located in front of the vehicle that is overlapped with respect to a width of the vehicle being driven in the event of a collision is equal to or larger than a predetermined overlap value; and
    wherein the control unit, only when the exterior airbag has been deployed, compares the relative speed to a second interior critical speed and subsequently deploys the interior airbag if the relative speed exceeds the second interior critical speed.

2. The airbag control system as set forth in claim 1, wherein the second interior critical speed is approximately 22 km/h to approximately 32 km/h.

3. The airbag control system as set forth in claim 1, wherein the first critical value is approximately 200 msec.

4. The airbag control system as set forth in claim 1, wherein the predetermined overlap value is approximately 5%.

5. The airbag control system as set forth in claim 1, wherein the first exterior critical speed is smaller than the second interior critical speed.

6. The airbag control system as set forth in claim 1, wherein the first exterior critical speed is approximately 17 km/h to approximately 27 km/h.

7. The airbag control system as set forth in claim 1, wherein the control unit determines whether speed values of the vehicle in directions of an X axis and a Y-axis exceed second critical values when the relative speed is larger than the second interior critical speed at which the interior airbag is deployed, and deploys the interior airbag when the speed values of the X axis and the Y-axis exceed the second critical values.

8. The airbag control system as set forth in claim 7, wherein the X axis and Y axis are a longitudinal direction and a traverse direction of the vehicle.

9. The airbag control system as set forth in claim 1, wherein the interior airbag comprises a driver seat airbag and a passenger seat airbag, the control unit is further connected to a passenger detection sensor unit which determines whether a passenger is sitting in a passenger seat or not, and the control units control the passenger seat airbag not deployed when absence of the passenger is detected by the passenger detection sensor unit.

* * * * *